United States Patent [19]

Lenz

[11] 4,315,373
[45] Feb. 16, 1982

[54] MACHINE VISE PROTRACTOR

[75] Inventor: John D. Lenz, Coon Rapids, Minn.

[73] Assignee: Kurt Manufacturing Company, Inc., Minneapolis, Minn.

[21] Appl. No.: 124,465

[22] Filed: Feb. 25, 1980

[51] Int. Cl.³ .......................... G01B 3/56; G01B 5/24
[52] U.S. Cl. ............................. 33/174 TD; 33/185 R; 269/81
[58] Field of Search .......... 33/1 N, 174 TA, 174 TD, 33/181 R, 185 R; 269/55, 63, 80, 81

[56] References Cited

U.S. PATENT DOCUMENTS

| 235,469 | 12/1880 | Stephens. | |
|---|---|---|---|
| 2,538,640 | 1/1951 | Click | 33/174 TD |
| 3,197,197 | 7/1965 | Butin et al. | 269/81 |
| 3,785,634 | 1/1974 | Denker | 269/76 |
| 3,958,335 | 5/1976 | Arnold et al. | 33/174 TD |

FOREIGN PATENT DOCUMENTS 60471  3/1926  Sweden ................................. 269/81

Primary Examiner—Richard R. Stearns
Attorney, Agent, or Firm—Kinney, Lange, Braddock, Westman and Fairbairn

[57] ABSTRACT

A machine vise protractor which can be installed onto and removed from the base of a machine vise while the vise is mounted on a table, to permit rotating the vise about a known center point to a desired angle. The protractor assembly is easy to make, can be adapted to a wide number of machine vises, and can be removed once the vise is properly located to keep the table uncluttered while the vise is clamped in place. The protractor can also be used with a plurality of vises for setting up several machine tools, or with several vises on the same machine tool without incurring the expense of separate protractors for each vise.

9 Claims, 4 Drawing Figures

MACHINE VISE PROTRACTOR

BACKGROUND OF THE INVENTION

1. Field of the Invention

The present invention relates to simplified, removable protractors that can be used with machine vises for adjusting the angular position of the vises.

2. Prior Art

Machine vises have long been mounted on protractor bases which raise the vise body up from the table on which it is mounted, but which permits angular positioning of the vise relative to a reference position.

In many of the bases used, a centering pin is fitted into a receptacle on the bottom of the vise body. This same receptacle and provided slots in the vise base are utilized with the present protractor. The slots in the bottom surface of the vise extend out to the peripheral edges of the vise for use with the present device.

SUMMARY OF THE INVENTION

An easily utilized and multiple purpose protractor member for use with machine tool vises comprising a flat plate having angle indicia around a peripheral edge, and means for locating the member in a known relation to the vise center. The plate is held relative to the vise with interlocking tongue and groove members. A separate indicator can be utilized in a tool table slot in connection with the indicia to indicate the angular position relative to a reference position.

As shown, the vise is also centered on a pivot pin member mounted in the machine tool table.

Specifically as shown, slots which are formed on the bottom surfaces of many vises are extended to the edges of the vise and two such slots positioned at 90° to each other and intersecting at the center of the vise are for mounting the protractor. The protractor member has a first fixed tongue which fits into one of the slots, and a telescoping or retractable tongue that may be extended to fit into another slot on the vise to permit the protractor member to be attached to and removed from the vise quite easily.

DESCRIPTION OF THE PREFERRED EMBODIMENTS

Figure 1:
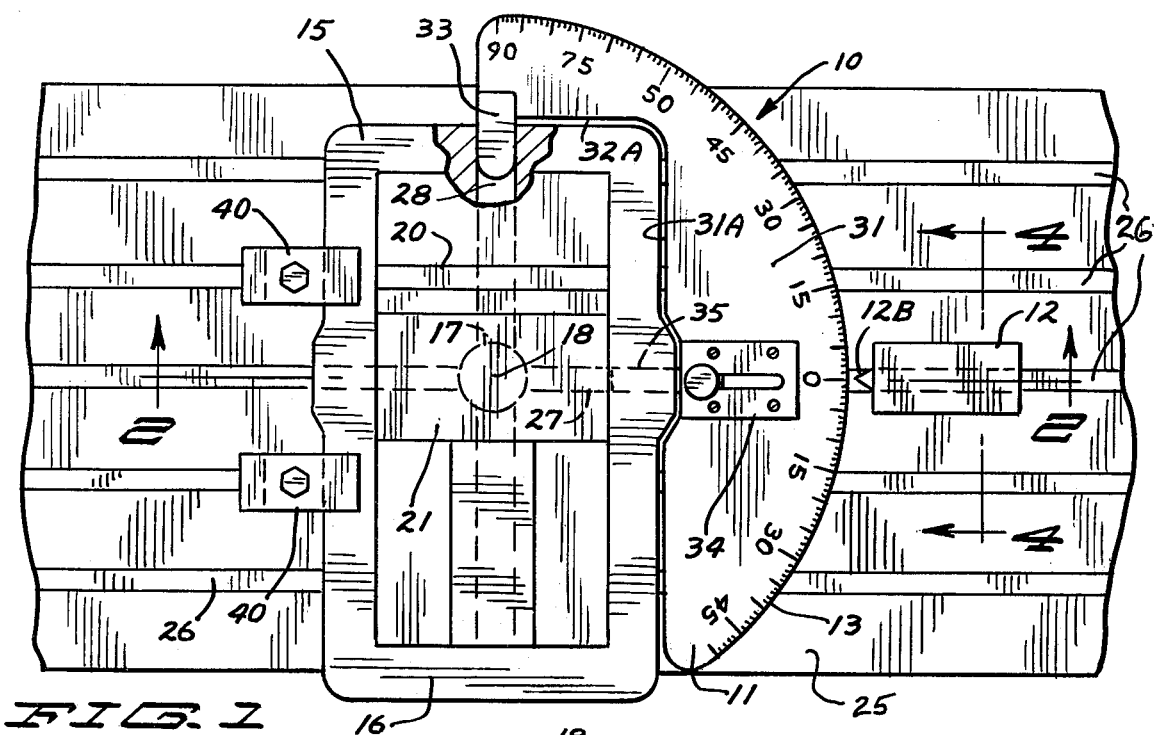
FIG. 1 is a top plan view in showing a machine vise schematically, and which has a protractor made according to the present invention installed thereon.

A protractor assembly indicated generally at 10 includes a planar protractor plate 11, and an indicator 12 used in connection with outer angle indicating indicia 13 which is placed on the protractor plate 11 adjacent to the outer part circular peripheral edge. The protractor itself is used in connection with a vise 15 having a base 16 which is provided on its bottom surface with a receptacle for receiving a headed centering pin 17. The receptacle on the bottom of the vise is centered along the central axis 18 of the vise 15. The vise 15 has suitable jaws which were indicated generally at 20, and a movable jaw 21 can be actuated in a desired manner toward and away from the fixed jaw.

Figure 4:
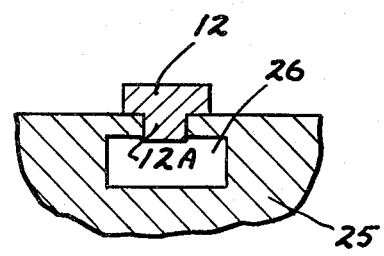
FIG. 4 is a sectional view taken as on line 4—4 in FIG. 1.

The vise 15 is adapted to be mounted onto a machine tool table indicated generally at 25 which as shown has a plurality of inverted T shaped slots 26 defined therein. The cross sectional shape of the slot is shown in FIG. 4, and the inverted T shaped slots are conventionally used for clamping vises and other members onto machine tool tables.

Figure 2:
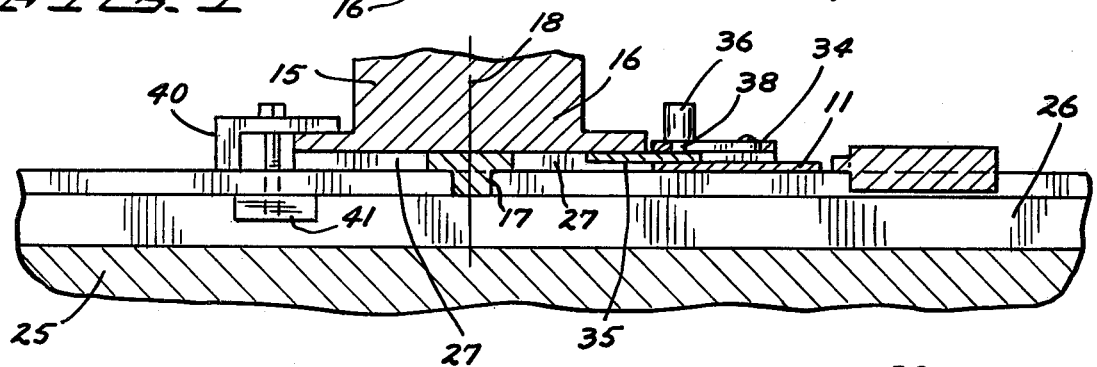
FIG. 2 is a sectional view taken as on line 2—2 in FIG. 1.

The vise base 16 besides having the receptacle for holding the pivot or centering pin 17 in place is provided with slot means that open to the outer edges and have center lines which intersect at the axis 18. For example in the form shown, there is a slot 27 that extends transversely across the narrow dimension of the vise, which is shown in dotted lines in FIG. 1 as well as in solid lines in FIG. 2, and a slot 28 which is perpendicular to the slot 27.

The slot 28 is longitudinally extending and in the form shown can extend all the way along the length of the vise base, or if desired it could terminate short of the center portions of the vise. It is required that the slot has a slot end portion that opens to the peripheral edge of the vise base. It should also be noted that the head of the pivot member or pin 17 should be of sufficiently large diameter so that the pin will stay in position at the intersection of the slots 27 and 28, so preferably the head is of larger diameter than the width of the slots.

The protractor plate 11 includes a main portion 31, and an end portion 32. The main portion 31 extends along the longitudinal edge of the vise 15, adjacent to the perimeter of the vise, and the end portion 32 extends around one end of the vise. The protractor plate 11 has edges which extend along two generally mutually perpendicular edges of the vise. On the end portion 32 of plate 11, an inwardly directed tongue member 33 is provided which is of size to closely fit within the slot 28. The tongue 33 extends into the slot 28 only a short distance, but the tongue holds the protractor plate 11 quite securely from transverse movement laterally of the vise.

The main portion 31 of the protractor plate 11 has a slide bracket 34 mounted thereon, and a retractable tongue 35 is slidably mounted in the slide bracket 34 and has a control knob 36 which extends upwardly above the slide bracket. The control knob 36 is fastened to a shaft 38 which extends through a provided slot 37. The tongue 35 can be retracted so that the end of it clears the side edge of the vise base 16 which is adjacent the aligning edge or corresponding edge of the protractor plate.

When tongue 35 is retracted, the tongue 33 also can be longitudinally slid out of the slot 28 so that the protractor member can be removed completely from the vise.

Figure 3:
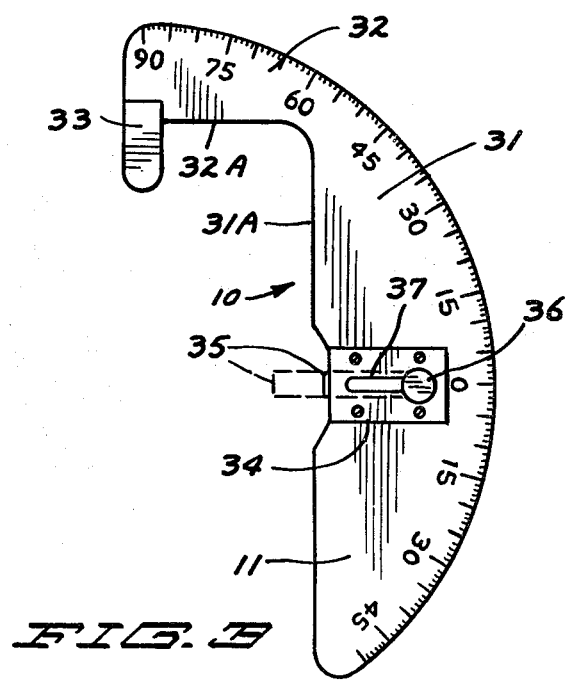
FIG. 3 is a top plan view of the protractor member shown in FIG. 1.

When the plate 11 is again placed flush along the top of the table 25, with the tongue 33 in the slot 28, the tongue or key 36 can there be moved to its dotted line position shown in FIG. 3 (or its solid line position shown in FIG. 2), so that the tongue or key enters the end of slot 27 and positively latches the protractor plate 11 in position relative to the center axis 18 of the vise.

The center lines of the tongues 33 and 35 also intersect at the axis 18, which is the central axis of the vise perpendicular to the table 25.

The indicator 12, as shown, is generally T shaped and has a narrow neck portion 12A which fits within the top portions of the slots 26, and the top part of the indicator 12 has a needle or indicator pointer 12B that is positioned closely adjacent the peripheral edge of the protractor plate 11 and thus adjacent the indicia 13 so that it can indicate the angular position of the longitudinal axis of the vise, which is the axis passing through axis 18 and perpendicular to the faces of the jaws 20. Once the vise is in position, suitable clamps indicated at 40 can be used for clamping the vise in position in a normal manner. The clamps 40 are shown only schematically, but include threadable members that are threaded into retainer clips or lugs 41 within the slot 26 of the table, and clamp the outer extending end portion of the clamps 40 against the base 16 of the vise.

Thus in combination, the vise base includes centering means for permitting rotation about a center axis located relative to the table slots 26, and the protractor plate is provided with keys or tongues that fit into provided receptacles on the vise that mate with these keys or tongues and hold the protractor plate in the desired position with the reference or zero indicia aligned along one axis of the vise that is at a known coordinate relative to the vise jaw faces. As shown, the zero indicia is along a plane parallel to the vise jaw faces, but zero could be the indicia perpendicular to the vise jaw faces if desired.

At least one of the tongues on the protractor plate is retractable to permit the protractor plate to be easily removed or installed relative to the slots or keyways on the vise base. An indicator which is stationary on the table when the vise and protractor plate rotate is mounted in a reference location relative to the center axis of the vise. The slots and tongues form interlocking, cooperating tongue and groove means between the vise and the protractor plate to securely hold the protractor plate in position.

The protractor plate is easy to use, and economical to make, as well as being usable with several vises.

What is claimed is:

1. For use in connection with a machine vise having means for establishing a central upright rotational axis permitting rotation of such vise relative to a table with which such vise is used, the improvement comprising a protractor plate for use with such vise having an outer edge formed about a circle center, and having angle indicating indicia indicating angles about such circle center adjacent said outer edge, said protractor plate having inner edge portions positioned adjacent such vise, and releasable interlocking means cooperating between the protractor plate inner edge portions and the vise to releasably retain the protractor plate relative to such vise with the circle center substantially coinciding with the central upright rotational axis of such vise.

2. The improvement claimed in claim 1 wherein the interlocking means comprises tongue and groove means which include at least one tongue which is retractable to a position wherein it does not interlock with its associated groove to thereby permit installation and removal of the protractor plate relative to the vise.

3. The improvement as specified in claim 2 wherein the vise with which the protractor plate is used has an end and an elongated side, the protractor plate having a main portion extending along the elongated side of such vise, and a second portion extending along the end of the vise, said protractor plate having inner edges generally corresponding to the edges of the elongated side and the end of such vise, and one cooperating tongue and groove at the side of such vise.

4. The improvement as claimed in claim 3 wherein the interlocking tongue and groove means at the longitudinal side of such vise includes means mounting the tongue to permit retracting the tongue from its associated groove.

5. The improvement of claim 1 wherein said means for establishing a central upright rotational axis comprises a pivot member cooperating between the vise with which the protractor plate is used and the top of a table on which such vise is mounted.

6. The improvement as claimed in claim 1, wherein the vise with which the protractor plate is used is mounted on a table having a plurality of slots defined therein, said means for establishing a central upright rotational axis on such vise including a pivot member insertable into one of the slots in the table and with which such vise is used, and also engaging the bottom of such vise.

7. The improvement of claim 6 including a pointer member mounted in the same slot that holds the pivot member, said pointer member being positioned adjacent the outer edge of said protractor plate and including a reference mark associated with the indicia adjacent said outer edge.

8. For use in connection with a machine vise having means for establishing a central upright rotational axis permitting rotation of the vise relative to a table with which the vise is used, said vise having a pair of sides, and a pair of ends, the vise further having a base provided with slots in the bottom of the vise base and opening to at least one end and one side, the improvement comprising a protractor plate for use with such vise having a part circular outer edge formed about a circle center substantially coinciding with the central upright rotational axis of such vise when the protractor plate is positioned adjacent such vise, the protractor plate having a portion carrying a first tongue which fits into the slot which opens to an end of such vise, and said protractor plate further carrying a second tongue which fits into the slot opening to one longitudinal side of such vise simultaneously with the fitting of the tongue into the slot opening to the end, at least one of said tongues being retractable to permit removal of the first tongue into the slot from such vise and installation of the protractor plate on such vise.

9. The improvement as claimed in claim 8 and an indicator member mounted on said table adjacent the part circular edge, said indicator member having a reference mark thereon to indicate angular relationships as such vise is moved about its central upright rotational axis.

* * * * *